Patented Mar. 5, 1940

2,192,664

UNITED STATES PATENT OFFICE 2,192,664

DERIVATIVES OF ALCOHOL AMINE CONDENSATION PRODUCTS

Wolf Kritchevsky, Chicago, Ill., assignor to Ninol, Inc., Chicago, Ill., a corporation of Illinois No Drawing. Application June 23, 1939, Serial No. 280,716

24 Claims. (Cl. 260—404)

My invention relates to a new class of chemical compounds and method of producing the same.

It has already been proposed to prepare condensation products of alcohol amines, particularly alkylolamines, with higher organic acids, for example, higher fatty acids, wherein the molal ratio of alcohol amine to higher organic acid is approximately one to one or less than one to one. Such compounds are disclosed in, among other publications, British Patent No. 337,737.

In my prior Patent No. 2,089,212, I have disclosed new chemical compounds having very valuable properties as emulsifying agents, as assistants in the textile and related industries, and for various other purposes. In general, said chemical compounds are condensation products of alkylolamines and higher molecular weight monocarboxylic acids, wherein the molal ratio of the alkylolamine to the acid is not substantially less than two to one. More particularly, the acids employed in said condensation products include the higher molecular weight aliphatic acids and, of this group, the higher fatty acids, especially those having between 12 and 18 carbon atoms, have been found especially useful.

In my prior Patent No. 2,094,609, I have disclosed new chemical compounds having valuable technical properties, which chemical compounds, in general, comprise condensation products of alkylolamines, amines and higher carboxylic acids, particularly higher fatty acids, the molal ratio of said reacting constituents being one mol of acid, at least one mol of alkylolamine and at least one mol of amine.

In my prior Patent No. 2,094,608, I have disclosed new chemical compounds having valuable technical properties, which chemical compounds, in general, comprise condensation products of alkylolamines and polycarboxylic acids wherein there is present not substantially less than two mols of alkylolamine for each carboxyl group of the polycarboxylic acid.

In each of the patents referred to above, and as described therein, instead of the free acids, derivatives thereof may be employed such as esters, amides, anhydrides and halides.

In general, the condensation products discussed hereinabove are basic in reaction when dissolved or dispersed in aqueous media, many of said products having a pH ranging from about 8.0 to 10.0, and they will form salts with acids or acidic substances such as acetic acid, hydrochloric acid, lactic acid, and the like.

I have found that it is important, for many purposes, to provide products of the general character described having an acid reaction or, in other words, a pH below 7, in some cases as low as 3 or 4 or even still lower. To this end, I have discovered that if the condensation products described above are reacted with halogen derivatives of metalloids such as sulphur and phosphorus, the resulting novel products not only have an acid reaction but, in addition, possess properties rendering them unusually satisfactory for many purposes.

In general, my novel products are prepared by reacting condensation products such as those described in the prior patents referred to hereinabove with derivatives of metalloids, particularly of sulphur and phosphorus. Among these latter compounds which may be reacted with the condensation products described in the previously mentioned patents are, for example, $SOCl_2$, $SOBr_2$, $SOF_2$, $SO_2Cl_2$, $PCl_3$, $PCl_5$, $PBr_3$, $PI_3$, $S_2Cl_2$, $SCl_2$, $PF_3$, $POCl_3$, and the like. Those compounds which are gaseous, for example, $PF_3$, will obviously be utilized in a closed system and, because of inconvenience of handling, are not preferred.

In order that those skilled in the art may fully understand the novel teachings of my invention, I shall refer to several illustrative embodiments of my invention. It will be understood, however, that these examples are merely descriptive and in no sense limitative of the scope of my invention, the latter being pointed out in the claims. Thus, for example, the proportions of reacting materials may be changed, the conditions of the reaction such as the temperature may be altered, and different reactants may be utilized, all falling within the novel teachings of my invention as hereinafter pointed out.

Example I

To 100 grams of a condensation product of two mols of diethanolamine and one mol of coconut oil mixed fatty acids, prepared by heating the mixture for two to three hours at 150 degrees C., 32 grams thionyl chloride were added slowly. The addition of the thionyl chloride was started at a temperature of 28 degrees C. which soon rose, however, to 60 degrees C. The temperature was kept at 60 degrees C. to 70 degrees C. and the reaction mass was then heated for four hours on the water bath and for an additional two hours on the glycerin bath at 130 degrees C. to 140 degrees C. The product had a pH of 2.53.

Example II

To 90 grams of a condensation product of two mols of diethanolamine and one mol of stearic acid, prepared by heating the mixture at 150 degrees C. to 170 degrees C. for two to three hours, there were added dropwise 24 grams of thionyl chloride. The mass was kept at 60 degrees C. to 70 degrees C. for approximately two hours and was then heated for four hours on the water bath and for two hours more at 120 degrees C. to 130 degrees C. on the glycerin bath. The reaction product had a pH of 2.9.

Example III

To 16 grams of a condensation product of two mols of diethanolamine and one mol of coconut oil mixed fatty acids, prepared as described in Example I, 6 grams of phosphorus trichloride were added drop by drop. A vigorous reaction ensued, the temperature rising to about 80 degrees C. The reaction product had a pH of 5.

Example IV

To 16 grams of a condensation product of two mols of diethanolamine and one mol of oleic acid, prepared by heating the mixture to a temperature of 150 degrees C. to 160 degrees C. for from two or three hours, one gram of phosphorus oxychloride was added drop by drop, the temperature rising to 90 degrees C. The reaction mass was then heated for one hour on the water bath.

Example V 90 grams of a condensation product of one mol of diethanolamine and one mol of coconut oil mixed fatty acids, prepared by heating the mixture for three hours at 160 degrees C., were reacted with 12 grams of thionyl chloride, the latter being added dropwise to the condensation product. The reaction mass was then heated on the water bath for three hours.

I have not definitely ascertained the exact structure of the compounds which I produce herein and, accordingly, prefer to claim them as reaction products. The halogen-containing metalloids, however, unite with the condensation products with the splitting out of a halogen acid. It will be appreciated that, in most cases, my novel compounds represent mixtures of different products, this being particularly the case where, for example, commercial sources of raw materials are employed such as commercial triethanolamine, commercial fatty acids, and the like. It will be understood that the amount of halogen-containing metalloid may be varied with the result that the compounds produced will likewise vary somewhat in their specific properties.

The temperature at which the condensation products are reacted with the halogen-containing metalloid will likewise vary within relatively wide ranges, this being dependent, obviously, upon the reactivity of the particular condensation product employed with the particular halogen-containing metalloid, upon the speed of reaction desired, and upon other factors obvious to the skilled chemist. In general, temperatures of 90 degrees C. to 150 degrees C. will serve satisfactorily although the temperatures may be somewhat above or below this range.

While my present invention encompasses the preparation of novel derivatives of condensation products of alcohol amines or alkylolamines and higher molecular weight carboxylic acids irrespective of the molal ratio of said alcohol amines or alkylolamines to said carboxylic acids, I wish to distinguish sharply between those wherein such molal ratio is one to one or less than one to one, as shown by said British patent, and those wherein said molal ratio is not substantially less than two to one, as shown in my aforementioned patents. The derivatives produced from the latter type of condensation products have particularly satisfactory properties and I make specific claim thereto.

The products of my present invention find use in connection with the preparation of emulsions of oleaginous and aqueous materials including the preparation of cosmetic emulsions such as face creams, cold creams, anti-perspiration creams, vanishing creams, brushless shaving creams, and the like. They are also of marked utility in ore separation processes, as disclosed in my copending application, Serial No. 150,757, filed June 28, 1937, now Patent No. 2,173,909, particularly for the separation of silica by flotation or the like. Other uses of the compounds are in connection with the treatment of paper; in the dehairing of hides and fat liquoring and other treatments of leather, in the treatment of furs, cotton, wool artificial fibers and similar materials in the textile industry. For example, said materials may be employed for the softening of fibres such as synthetic fibres or cellulose fibres as, for example, lustrous and delustered cellulose esters or cellulose ethers including cellulose acetate, cellulose propionate, as well as regenerated cellulose or rayon and the like, prior to or after dyeing. In general, the compounds may be employed in aqueous solutions containing quite small proportions, for example, 0.001% to 0.01% or even more or less, and the cellulose fibres may be contacted therewith in any suitable form such as filaments, threads, yarns, skeins or fabrics. In the textile industry, they may be employed, apart from the uses disclosed above, for such diverse purposes as assistants in dyeing operations, to insure even, level shades, and as dispersing agents for insoluble organic dyes and inorganic pigments, in baths for carbonizing wool, for aiding in discharging colors and stains from fabrics, in fulling baths, in the lustering, delustering, and weighting of fabrics, in sizes, and the like. Again, in the treatment of paper, the compounds have utility as softening agents and may be employed in the digester. The compounds function also to improve the action of fungicidal, parasiticidal, insecticidal and antiseptic and disinfectant preparations where they serve, among other things, as spreading agents. Other uses are in floor polish emulsions where an aqueous vehicle is emulsified with waxes or the like. The compounds also possess utility in the preparation of printing pastes and in paints, lacquers and similar coating compositons. It will, of course, be appreciated that the uses mentioned above are only illustrative and that the compounds may be effectively employed for other purposes which will be understood by those skilled in the art in the light of the detailed description of my invention.

I employ the term "condensation product" herein, as well as in my issued patents referred to above, to mean a reaction product between the reacting constituents, for example, alkylolamine and acid, wherein water or acid or the like is split out as a result of the union of the molecules of said reacting constituents. Similarly, the term "condensed" means a reaction involving the splitting out of water or acid or the like from the reacting constituents.

Wherever the term "higher" is employed herein as referring to fatty acids or the like, it will be understood to mean at least six carbon atoms, unless otherwise stated.

What I claim as new and desire to protect by Letters Patent of the United States is:

1. The method of preparing acid-reacting products from a condensation product of alcohol amine and higher carboxylic acid substance, said condensation product normally having an alkaline reaction in aqueous media, which comprises condensing therewith an organic compound which unites with said condensation product to produce an acid-reacting product, said organic compound being a halogen-containing metalloid.

2. The method of claim 1 wherein the organic compound which unites with said condensation product is a halogen derivative of the class consisting of sulphur and phosphorus.

3. The method of claim 1 wherein the organic compound which unites with said condensation product is a thionyl halide.

4. The method of claim 1 wherein the organic compound which unites with said condensation product is thionyl chloride.

5. The method of claim 1 wherein the alcohol amine comprises an ethanolamine and wherein the higher carboxylic acid substance comprises a member selected from the group consisting of fatty acids containing between twelve and eighteen carbon atoms, their esters, amides, anhydrides and halides.

6. The method of preparing acid-reacting products from a condensation product of alcohol amine and higher molecular weight carboxylic acid substance, the molal ratio of the alcohol amine to the carboxylic acid present in said condensation product being not substantially less than two mols of alcohol amine for each carboxyl group present in said acid, said condensation product normally having an alkaline reaction in aqueous media, which comprises condensing therewith an organic compound which unites with said condensation product to produce an acid-reacting product, said organic compound being a halogen-containing metalloid.

7. Products having an acid reaction in aqueous media, comprising reaction products of halogen-containing metalloids with condensation products of alcohol amines and a member selected from the group consisting of higher molecular weight organic acids, their triglycerides, esters, amides, anhydrides, halides, and mixtures thereof.

8. Reaction products in accordance with claim 7 wherein the alcohol amines are ethanolamines and the halogen-containing metalloid is a thionyl halide.

9. Acid-reacting condensation products comprising the reaction product of a halogen-containing metalloid with a condensation product of alcohol amine and higher carboxylic acid substance, the molal ratio of the alcohol amine to the carboxylic acid present in said condensation product being not substantially less than two mols of alcohol amine for each carboxyl group present in said higher carboxylic acid substance.

10. Acid-reacting condensation products comprising the reaction product of a halogen-containing metalloid with a condensation product of alkylolamine and higher fatty acid substance containing between twelve and eighteen carbon atoms, the molal ratio of the alkylolamine to the higher fatty acid present in said condensation product being not substantially less than two mols of alkylolamine for each carboxyl group present in said higher fatty acid substance.

11. Products in accordance with claim 10 wherein the alkylolamine comprises an ethanolamine.

12. Products in accordance with claim 10 wherein the alkylolamine comprises an ethanolamine and the metalloid comprises a thionyl halide.

13. Acid-reacting condensation products comprising the reaction product of a thinoyl halide with a condensation product of alkylolamine and fatty acid, said fatty acid containing between twelve and eighteen carbon atoms, the molal ratio of the alkylolamine to the fatty acid present in said condensation product being not substantially less than two to one.

14. Products in accordance with claim 13 wherein the alkylolamine comprises a member selected from the group consisting of monoethanolamine, diethanolamine, triethanolamine, and mixtures thereof.

15. Acid-reacting condensation products comprising the reaction product of thionyl chloride with a condensation product of alkylolamine and a member of the group consisting of carboxylic acids containing at least twelve carbon atoms, their esters, amides, anhydrides, and halides, there being present in said condensation product not substantially less than two mols of alkylolamine for each carboxyl group present in said carboxylic acid.

16. Products in accordance with claim 15 wherein the carboxylic acid is a fatty acid.

17. Acid-reacting condensation products comprising the reaction product of a halogen-containing metalloid with a condensation product of at least one mol of alkylolamine, at least one mol of amine, and a member of the group consisting of higher carboxylic acids, their esters, halides, amides, and anhydrides, approximately one mol of higher carboxylic acid being present in said condensation product.

18. Products in accordance with claim 17 wherein the higher carboxylic acid is a higher fatty acid containing from twelve to eighteen carbon atoms.

19. Reaction products of thionyl halides with condensation products of alkylolamines and a member selected from the group consisting of higher molecular weight fatty acids, their triglycerides, esters, amides, anhydrides, halides, and mixtures thereof.

20. Reaction products in accordance with claim 19 wherein the alkylolamines are selected from the group consisting of monoethanolamine, diethanolamine, triethanolamine, and mixtures thereof, and wherein the higher fatty acids consist predominantly of those containing from twelve to eighteen carbon atoms.

21. Reaction products of thionyl halides with condensation products of alkylolamines and higher fatty acids, the molal ratio of the alkylolamines to the higher fatty acids being not substantially less than two to one.

22. Reaction products in accordance with claim 21 wherein the alkylolamine is selected from the group consisting of monoethanolamine, diethanolamine, triethanolamine and mixtures thereof, and the higher fatty acid is derived from triglyceride oils and fats or waxes.

23. Reaction products of thionyl chloride with condensation products of coconut oil mixed fatty acids and alkylolamines, the molal ratio of the alkylolamine to the coconut oil mixed fatty acids being not substantially less than two to one.

24. Reaction products in accordance with claim 23 wherein the alkylolamine consists predominantly of diethanolamine.

WOLF KRITCHEVSKY.